(12) United States Patent
Bigelow et al.

(10) Patent No.: US 12,144,289 B2
(45) Date of Patent: Nov. 19, 2024

(54) THRESHING TOOL

(71) Applicant: F.P. Bourgault Tillage Tools Ltd., St. Brieux (CA)

(72) Inventors: Dean Bigelow, St. Brieux (CA); Dylan Theis, St. Brieux (CA); Robin Pomedli, St. Brieux (CA); Corny Chomenchuk, St. Brieux (CA)

(73) Assignee: F.P. BOURGAULT TILLAGE TOOLS LTD., St. Brieux (CA)

( * ) Notice: Subject to any disclaimer, the term of this patent is extended or adjusted under 35 U.S.C. 154(b) by 712 days.

(21) Appl. No.: 17/371,570

(22) Filed: Jul. 9, 2021

(65) Prior Publication Data

US 2022/0007585 A1 Jan. 13, 2022

Related U.S. Application Data

(60) Provisional application No. 63/179,763, filed on Apr. 26, 2021, provisional application No. 63/050,215, filed on Jul. 10, 2020.

(51) Int. Cl.
*A01F 12/18* (2006.01)

(52) U.S. Cl.
CPC .................. *A01F 12/182* (2013.01)

(58) Field of Classification Search
CPC . A01D 41/06; A01F 7/06; A01F 12/22; A01F 12/40; A01F 12/181; A01F 12/24; A01F 12/26; A01F 12/28; A01F 12/182; A01F 33/06
See application file for complete search history.

(56) References Cited

U.S. PATENT DOCUMENTS

| | | | | |
|---|---|---|---|---|
| 3,410,271 A | * | 11/1968 | Hengen | A01F 12/22 460/122 |
| 4,338,954 A | * | 7/1982 | Kirst | A01F 12/22 460/122 |
| 2019/0208693 A1 | * | 7/2019 | Janzen | A01B 23/02 |
| 2020/0329641 A1 | * | 10/2020 | Li | A01F 12/181 |

* cited by examiner

*Primary Examiner* — Thomas B Will
*Assistant Examiner* — Robert E Pezzuto

(57) ABSTRACT

A threshing pin for use with a threshing cylinder of a harvesting machine is disclosed. The pin has an attachment portion for attaching the pin to the threshing cylinder, and a threshing portion extending from the attachment portion for contacting the material to be threshed, wherein the threshing portion includes a recess in an outer surface of the threshing portion, the recess being occupied by a wear life-extending material. A corresponding method is also disclosed.

17 Claims, 9 Drawing Sheets

THRESHING TOOL

CROSS REFERENCE TO RELATED APPLICATIONS

This application claims the benefit of U.S. Provisional Patent Application No. 63/050,215 entitled "THRESHING TOOL" filed Jul. 10, 2020, and U.S. Provisional Patent Application No. 63/179,763 entitled "THRESHING TOOL" filed Apr. 26, 2021, the entire contents of which are incorporated herein by reference

FIELD

This application relates generally to threshing tools and, in particular, to threshing pins for use in harvesters and combines.

BACKGROUND

In some harvesting machines, a threshing cylinder is provided for threshing the harvested produce and separating the seed to be collected from the stalk and remainder. In particular, in some bean harvesters and harvesters for other legumes, such as peanuts, a threshing cylinder includes a rotating auger that feeds the material to be threshed from an intake to an exit. Threshing tools, such as pins, extend from the auger blades and thresh the produce in a gap between the auger and a grate through which the threshed seeds fall. The remainder of the harvested plant material is fed along the auger to the exit and is collected.

Since the threshing tools are exposed to abrasive wear, they wear over the course of their life and must be periodically replaced. In cases of heavy usage, the tools wear out relatively quickly. Accordingly, there is a desire to increase the wear life of such threshing tools.

SUMMARY

According to one aspect of the present disclosure, there is provided a threshing pin for use with a threshing cylinder of a harvesting machine, the pin comprising: an attachment portion for attaching the pin to the threshing cylinder, and a threshing portion extending from the attachment portion for contacting the material to be threshed, wherein the threshing portion includes a recess in an outer surface of the threshing portion, the recess being occupied by a wear life-extending material.

According to another aspect of the present disclosure, there is provided a method of augmenting the wear life of a threshing pin for use with a threshing cylinder of a harvesting machine, the method comprising: providing a threshing pin having a threshing portion for contacting the material to be threshed, the threshing portion having a shape; providing a recess in the outer surface of the threshing portion; and occupying the recess with a wear life-extending material such that the shape of the threshing portion is substantially maintained.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings' illustrative embodiments of the disclosure. It should be understood, however, that the application is not limited to the precise arrangements and instrumentalities shown. In the drawings.

DETAILED DESCRIPTION

Figure 1:
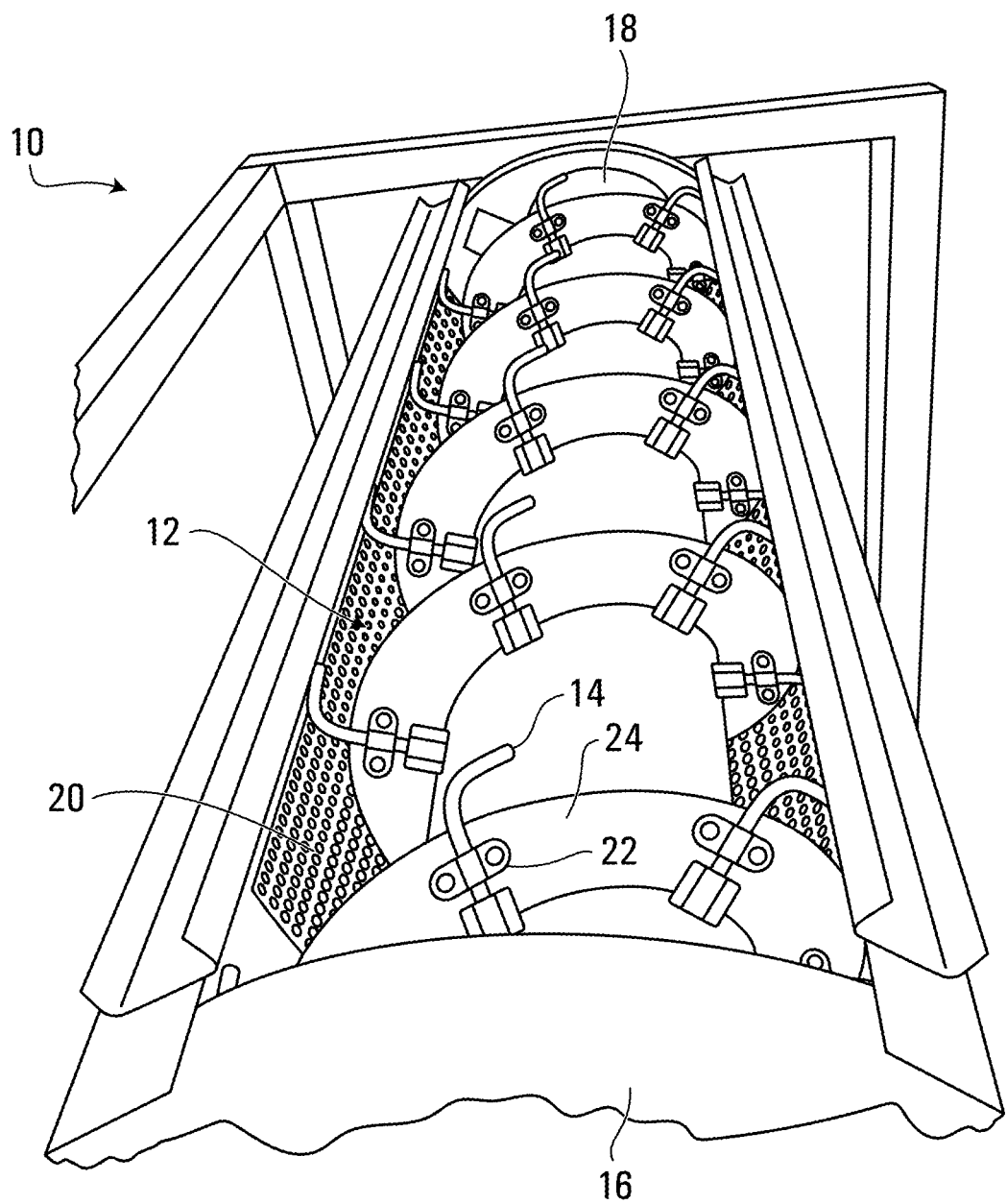
FIG. 1 shows a prior art threshing cylinder of a harvesting machine.

FIG. 1 shows a prior art threshing cylinder 10 of a harvesting machine. The threshing cylinder includes an auger 12 to which prior art threshing pins 14 are attached. As the auger rotates and feeds material from an entrance 16 to an exit 18, the threshing pins 14 thresh the material. The seeds, such as bean or peanuts, fall through the grated sieve 20. The threshing pins 14 are held in place by rounded clamps 22 bolted to auger blades 24.

Figure 2:
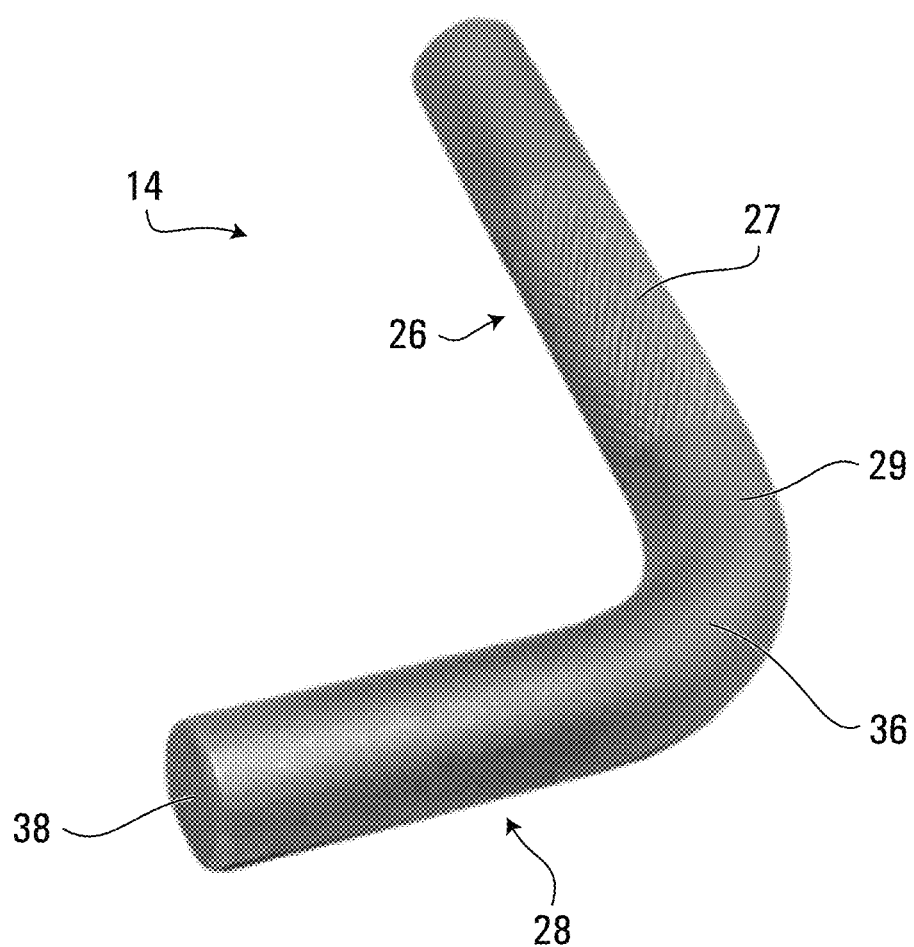
FIG. 2 shows one configuration of a threshing pin for use in the threshing cylinder of FIG. 1.
Figure 3:
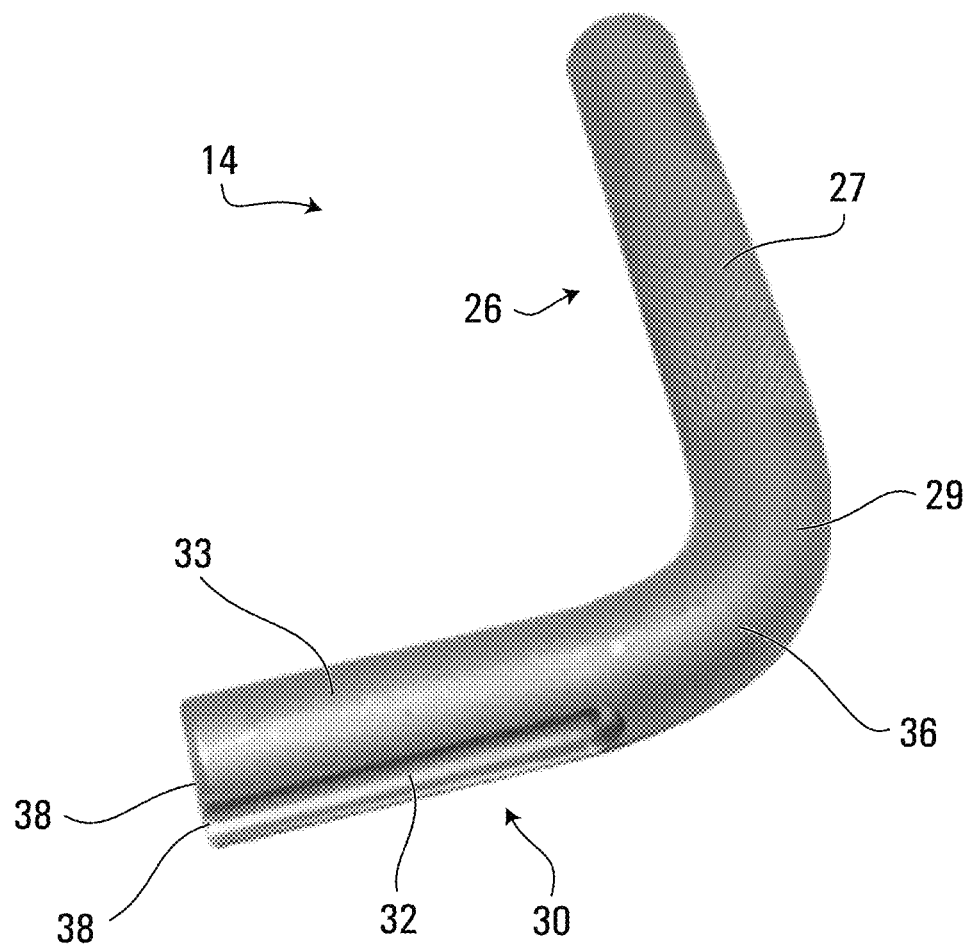
FIG. 3 shows a threshing pin according to embodiments of the present disclosure.
Figure 4:
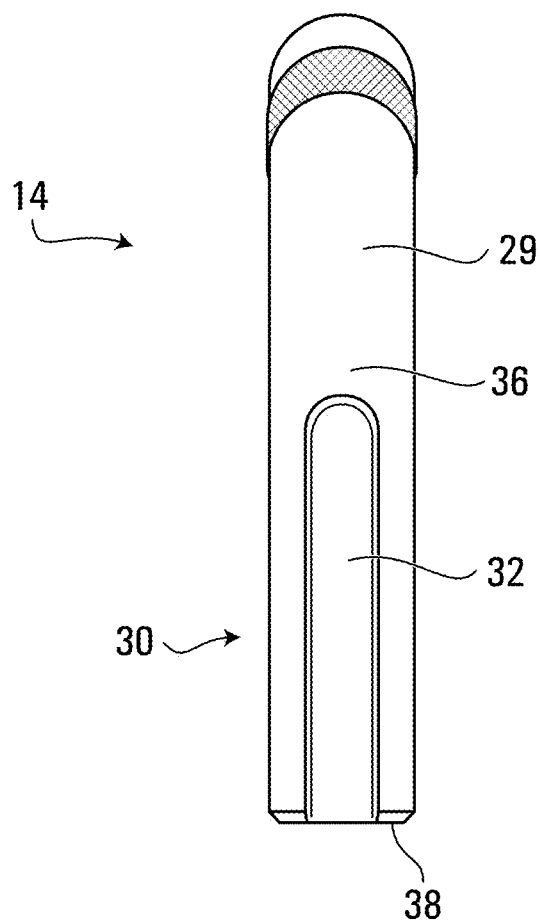
FIG. 4 shows front view of the pin of FIG. 3.
Figure 5:
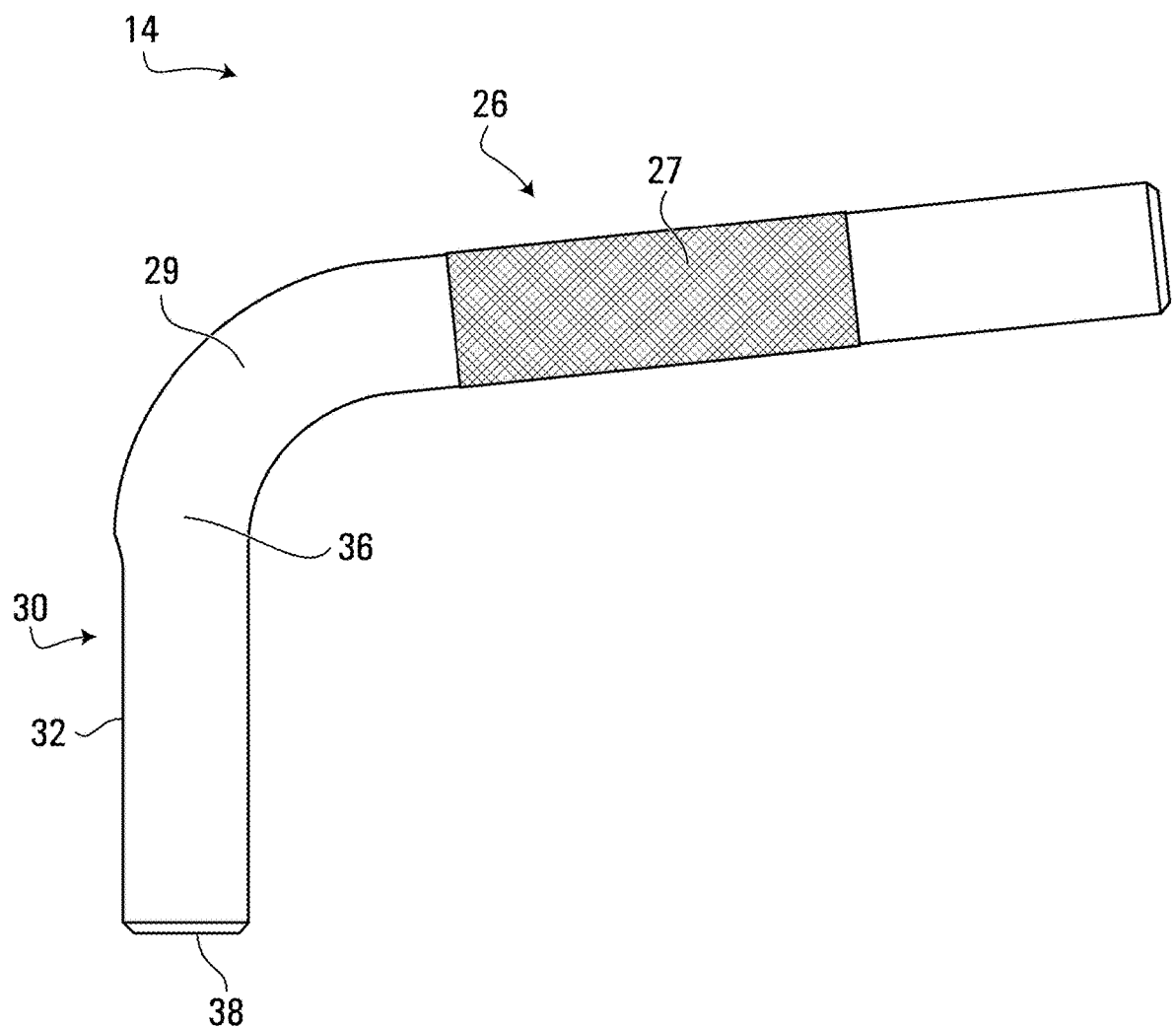
FIG. 5 shows a side view of the pin of FIG. 3.

FIG. 2 shows a threshing pin 14 that may be used in a threshing cylinder, such as the threshing cylinder 10. The threshing pin includes an attachment portion 26 and a threshing portion 28. The attachment portion 26 is configured as a cylindrical shaft that is inserted into and held in place by the clamps 22 of the threshing cylinder 10.

The threshing portion 28 extends from the attachment portion at a joint 29 at an angle. The angle may have a variety of values, for example between 0 and 180 degrees. In the illustrated embodiment, the angle is 96 degrees. The attachment portion 26 may include a knurled surface 27 to improve friction contact between the attachment portion 26 and the clamp 22.

Referring to FIGS. 3 to 7, one embodiment of a threshing pin 14 according to the present disclosure will be described. According to the present disclosure, a threshing pin 14 includes an attachment portion 26 for attaching the threshing pin 14 to a threshing cylinder, such as the threshing cylinder 10, and a modified threshing portion 30 joining and extending from the attachment portion 26 at joint 29 for contacting the material to be threshed.

Figure 6:
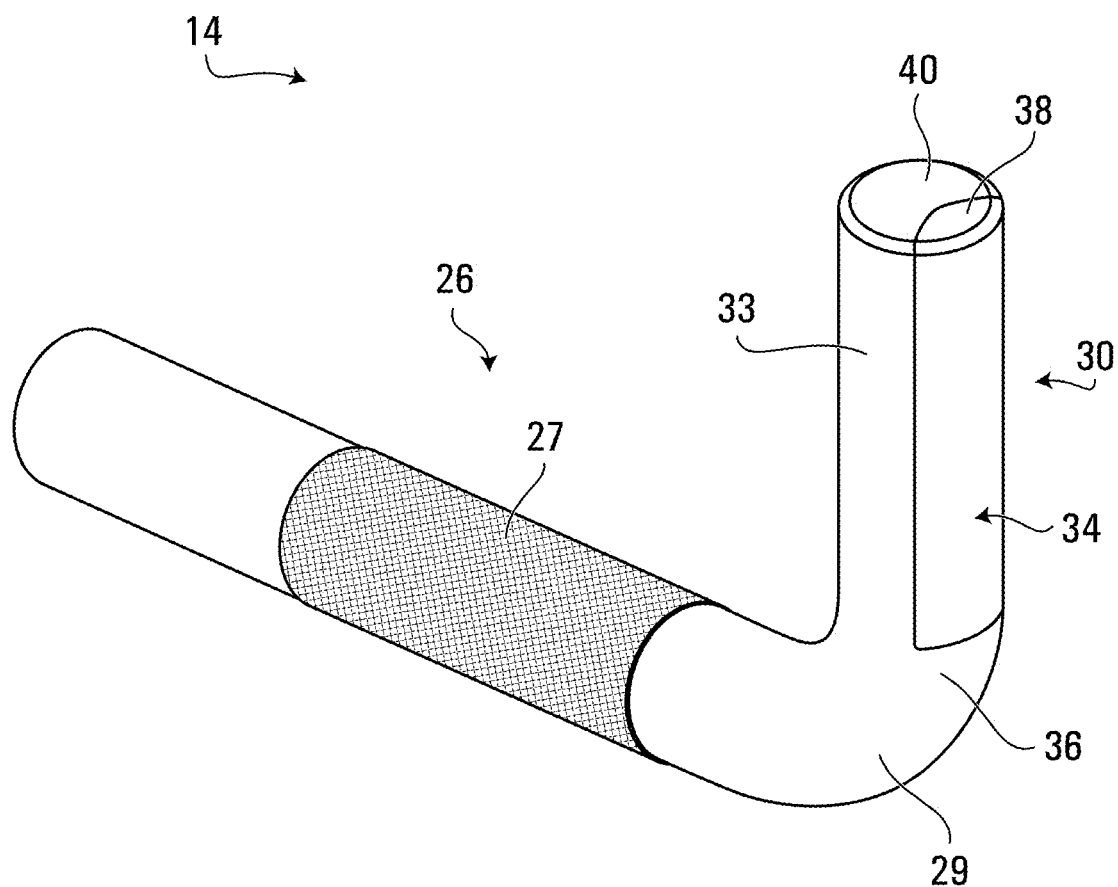
FIG. 6 shows a perspective view of the pin of FIG. 3 with the wear life-extending material.
Figure 7:
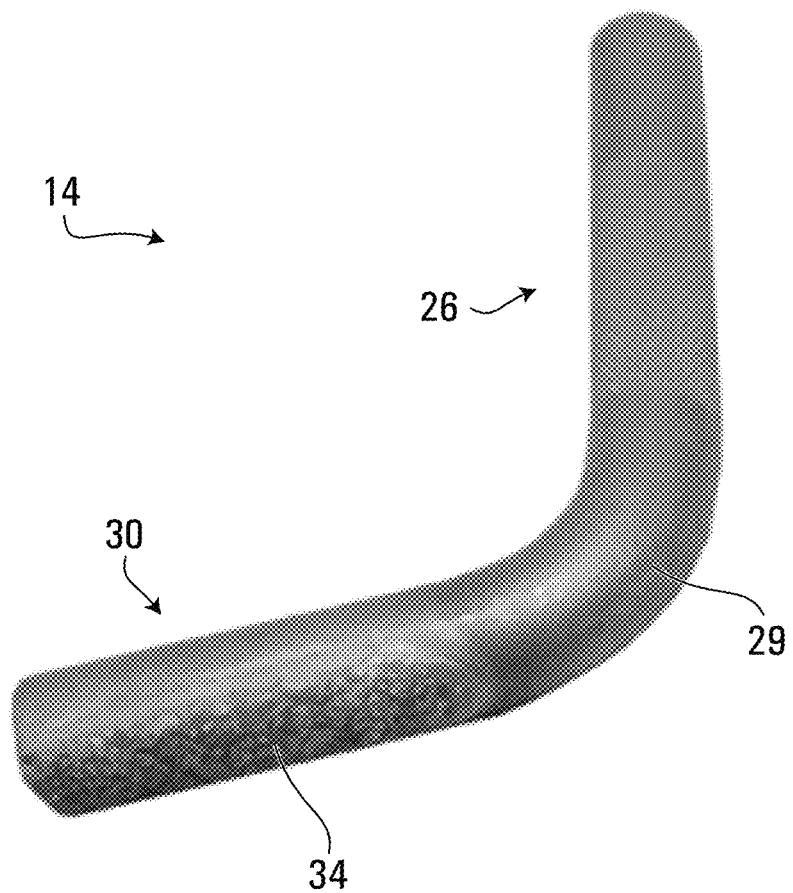
FIG. 7 shows another view of the pin of FIG. 6.

The modified threshing portion 30 includes a recess 32 in an outer surface 33 of the modified threshing portion 30. As best shown in FIGS. 6 and 7, the recess is occupied by a wear life-extending material 34 for extending the wear life of the threshing portion. The modified threshing portion 30 includes a first end 36 proximate the attachment portion 26, which first end 36 is integrally connected to the attachment portion 26 at the joint 29. A second, distal end 38 is opposite the first end 36 and terminates in an end surface 40. In the illustrated embodiment, the recess 32 extends along a portion of the modified threshing portion 30 to the distal end 38. In particular, the recess 32 is configured as a slot that extends along a part of the modified threshing portion 30 and removes part of the end surface 40.

Occupying the recess 32 with the wear life-extending material 34, as opposed to, for example, adding the wear life-extending material onto the outer surface 33 of the threshing portion 28, aids in substantially maintaining the cross-sectional shape of the threshing portion. This may reduce the damaging effect that an added-on wear life-extending material may have on the seeds to be threshed, while also extending the wear life of the threshing ping 14.

In other embodiments, the wear life-extending materials, such as a carbide overlay, may be applied directly onto the curved outer surface 33 without occupying a recess 32.

Both threshing portion 28 and the modified threshing portion 30 have a substantially circular cross-section. Indeed, the cross-section of the threshing pin 14 with modified threshing portion 30 has a substantially constant cross-section along an entire length of the threshing pin, that cross-sectional also being substantially circular.

In the illustrated embodiment, the recess 32 is configured as a slot that is provided in the threshing portion 28, for example using milling. In some embodiments, the wear life-extending material 34 is a carbide that is welded into the recess 32.

The recess 32 may be configured to cover all or a substantial part of the outer surface 33 that comes into contact with the material to be threshed.

Other configurations are possible and within the present disclosure. For example, the recess may be provided in a variety of ways including: forging, stamping, pressing, casting etc. The recess may be present when the threshing pin is provided. Moreover, the wear life-extending material may occupy the recess in a variety of ways. For example, an insert of wear life-extending material may be provided that has a shape complementary to a shape of the recess. This insert may then be welded, bolted, screwed or otherwise mechanically fixed to the recess.

Figure 8:
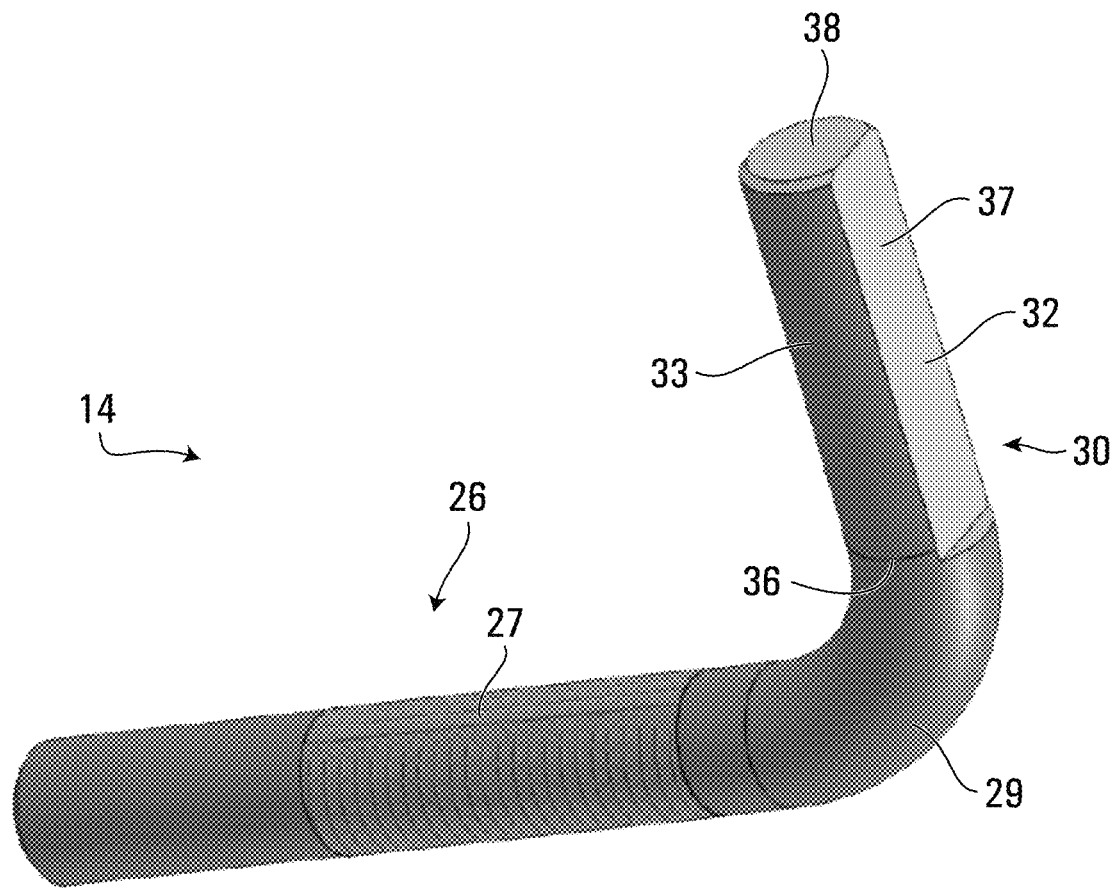
FIG. 8 shows a threshing pin according to another embodiment of the present disclosure.

Referring to FIG. 8, in some embodiments, the recess 32 is configured to have a flat portion 37 that has been, for example, machined into the threshing portion 28. In such embodiments, the wear life-extending material 34 may be applied, for example welded, directly onto the flat portion 37. The presence of a flat portion 37 may improve adherence of the wear life-extending material 34, such as improving the weld profile in the case where the wear life-extending material is welded on. In some such embodiments, the cross-sectional shape of the threshing portion 28 may be substantially maintained, as discussed above. In other such embodiments, the wear life-extending material 34 may result in a different desired geometry of the threshing portion 28.

The flat portion 37 may extend the entire length and width of the recess 32, as shown in the illustrated embodiment. Namely, in the illustrated embodiment, the recess 32 comprises an entire lengthwise cylindrical section cut out from the cylindrical threshing portion of the prior art pin. In other embodiments, one or more flat portions may be incorporated into a recess or recesses also having other geometries, such as a partial geometry matching that of the recess 32 in the embodiment of FIGS. 3 to 6.

A depth of the recess 32 and/or flat portion 37 may be different than shown in the illustrated embodiments. For example, the depth may be configured to accommodate the amount and/or shape of wear life-extending material 34.

Other geometries for the recess 32 are also possible.

It will also be understood that, in some embodiments, the precise geometries, sizing and positioning of the recess and wear life-extending material shown in the illustrated embodiment are not necessarily required, as long as the overall geometry of the modified threshing portion is maintained as desired. For example, while a threshing pin with generally circular cross-section has been shown, other cross-sections are possible. It is also not necessary that the threshing portion and attachment portion have the same or a similar cross-section. Generally, the attachment portion may have any configuration that permits attachment of the threshing pin or tool to a threshing machine. The threshing portion may also have a different geometry, depending on the use or application. For example, the threshing portion may have an oblong or oval cross-section.

More generally, a threshing tool according to the present disclosure may have an attachment portion attach to a threshing cylinder or other threshing device in a variety of ways without affecting the principles.

Also, generally, the threshing portion may be connected to the attachment portion in a variety of ways and not necessarily be integrally connected as shown. For example, the threshing and attachment portions may be mechanically connected or welded.

Moreover, while some embodiments described herein use a carbide material as the wear life-extending material, other wear life-extending materials may be used and are within the scope of the present disclosure. These may include hardened alloys known to those skilled in the art, including nickel alloys. Moreover, the wear life-extending material may be composed of multiple materials. For example, the wear life-extending material may comprise two materials, one of which may be the same as the material of the remainder of the threshing portion, and the other of which may be different and form the outer most layer of the wear life-extending material. A wear life-extending material, as defined herein, may also include material that is the same as the remainder of the threshing portion but has been treated to extend its wear life, including heat treatment, chemical treatment, mechanical treatment, surface treatment etc. More generally, the wear life-extending material may be any material, combination of materials or material treatment that provides a longer wear life as compared to material in the remainder of the threshing portion or threshing pin, thereby extending the wear life of the threshing portion.

While a single recess is shown in the illustrated embodiment, the present disclosure also contemplates multiple recesses or compartments within the outer surface of the threshing portion that may be occupied by wear life-extending material. Reference to "a" or "the" recess includes at least one of the multiple or disconnected recesses. Moreover, the exact geometry of the recess shown in the illustrated embodiment may be varied. For example, the recess may be larger or smaller or may have a different shape. It may take up over half of the volume of the threshing portion. It may not extend to an end of the threshing portion. It may extend into or beyond the joint or connection to the attachment portion.

More generally, while described in terms of a threshing pin used in threshing cylinders for hard-seeded vegetation such as beans and other legumes, the principles of the present disclosure may be applied to other threshing tools used in harvesting machines for other planted crops, with appropriate modification within the knowledge of a skilled person in the art.

Figure 9:
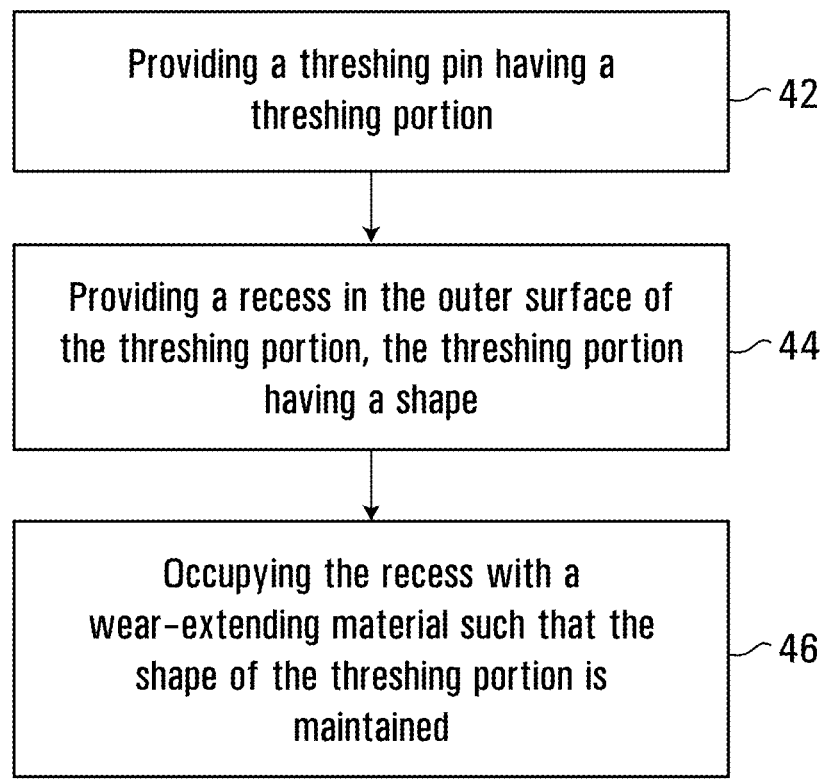
FIG. 9 shows a method according to embodiments of the present disclosure.

Referring to FIG. 9, according to the present disclosure, there is also provided a method for augmenting the wear life of a threshing pin. At 42 a threshing pin is provided having a threshing portion for contacting the material to be threshed. The threshing portion has a pre-existing shape. For example, this may include providing a threshing pin according to the prior art discussed above. This may also include providing a threshing pin with a threshing portion having a generally cylindrical shape or other shape.

At 44, a recess is provided in an outer surface of the threshing portion. For example, this may include milling or otherwise machining a slot along a length of the threshing portion. In some embodiments, this may include milling or otherwise producing a flat portion in the recess.

At 46, the recess is occupied with a wear life-extending material such that the shape of the threshing portion is substantially maintained. For example, this may include welding, brazing and/or heat treating a wear life-extending material, e.g. carbide, into the recess and/or on to a flat portion such that the pre-existing shape, such as a circular cross-section or cylindrical shape, is substantially maintained.

In some embodiments, the shape of the threshing portion is not substantially cylindrical but does include a curvature that is maintained after the wear life-extending material occupies the recess. In some embodiments, the recess is provided along a length of the threshing portion until an end of the threshing portion. In some embodiments, the recess is provided in a part of the threshing portion that substantially covers an area that comes into contact with the material to be threshed.

Other configurations are possible. For example, as noted above, other geometries of the threshing pin and threshing portion are possible. In embodiments where the threshing pin has a different shape, such as non-cylindrical shape, occupying the recess with the wear life-extending material would maintain this alternate shape. It is also noted that the recess is occupied with the wear life-extending material in such a manner that the shape is substantially maintained. The term substantially in this context should be understood as meaning that the exact shape is not necessarily maintained and that there may be some surface differences between the surface of the wear life-extending material occupying the recess and the outer surface of the threshing portion before the recess is provided or before the wear life-extending material occupies the recess.

More generally, the threshing pin being provided is not necessarily the prior art threshing pin discussed above. Indeed, the method according to the present disclosure may be applied to threshing pins and, more generally, threshing tools of varying geometries and configurations.

Numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, it will be understood that features of one embodiment may be combined with features of other embodiments, even if not expressly recited or described as a combination.

The invention claimed is:

1. A threshing pin for use with a threshing cylinder of a harvesting machine, the pin comprising:
   an attachment portion for attaching the pin to the threshing cylinder, and
   a threshing portion extending from the attachment portion for contacting a material to be threshed, wherein the threshing portion includes a recess in an outer surface of the threshing portion, the recess being occupied by a wear life-extending material, wherein the threshing portion, including the wear life-extending material occupying the recess, has a substantially circular cross-section, and wherein the substantially circular cross-section remains substantially constant along an entire length of the threshing portion.

2. The pin of claim 1, wherein cross-section of the pin remains substantially constant along an entire length of the threshing pin.

3. The pin of claim 1, wherein the threshing portion includes a first end proximate the attachment portion and a distal end, wherein the recess extends along a length of the threshing portion to the distal end of the threshing portion.

4. The pin of claim 1, wherein the recess is shaped as a slot extending along a length of the threshing portion.

5. The pin of claim 4, wherein the recess extends along an entire length of the threshing portion.

6. The pin of claim 1, wherein the wear life-extending material is welded or brazed into the recess.

7. The pin of claim 1, wherein the wear life-extending material is a carbide material.

8. The pin of claim 1, wherein the recess covers substantially all of a contact area of the threshing portion that contacts the material to be threshed.

9. The pin of claim 1, wherein the recess comprises a flat portion for the wear life-extending material to contact.

10. A method of augmenting a wear life of a threshing pin for use with a threshing cylinder of a harvesting machine, the method comprising:
    providing the threshing pin having a threshing portion for contacting a material to be threshed, the threshing portion having a shape;
    providing a recess in an outer surface of the threshing portion; and
    occupying the recess with a wear life-extending material, wherein the threshing portion, including the wear life-extending material occupying the recess, has a substantially circular cross-section, and wherein the substantially circular cross-section remains substantially constant along an entire length of the threshing portion.

11. The method of claim 10, wherein the shape comprises a curvature and the wear life-extending material substantially maintains the curvature.

12. The method of claim 10, wherein the shape is cylindrical.

13. The method of claim 10, wherein occupying the recess with the wear life-extending material comprises welding or brazing the wear life-extending material into the recess.

14. The method of claim 10, wherein providing the recess comprises providing a slot along a length of the threshing portion.

15. The method of claim 14, wherein providing the recess comprises providing the slot along an entire length of the threshing portion.

16. The method of claim 10, wherein providing the recess comprises providing the recess along a length direction of the threshing portion until an end of the threshing portion.

17. The method of claim 10, wherein providing the recess comprises providing the recess in substantially all of a contact area of the threshing portion that contacts the material to be threshed.

\* \* \* \* \*